US008780545B2

(12) United States Patent
Chen et al.

(10) Patent No.: US 8,780,545 B2
(45) Date of Patent: Jul. 15, 2014

(54) ELECTRONIC DEVICE ENCLOSURE WITH BRACKET FOR DATA STORAGE DEVICE

(75) Inventors: Yong-Nian Chen, Wuhan (CN); Hui Yu, Wuhan (CN); Si-Bo Wang, Wuhan (CN); Li-Fu Xu, Wuhan (CN)

(73) Assignees: Hong Fu Jin Precision Industry (WuHan) Co., Ltd., Wuhan (CN); Hon Hai Precision Industry Co., Ltd., New Taipei (TW)

( * ) Notice: Subject to any disclaimer, the term of this patent is extended or adjusted under 35 U.S.C. 154(b) by 176 days.

(21) Appl. No.: 13/474,806

(22) Filed: May 18, 2012

(65) Prior Publication Data
US 2013/0058035 A1    Mar. 7, 2013

(30) Foreign Application Priority Data

Sep. 2, 2011  (CN) .......................... 2011 1 0258019

(51) Int. Cl.
 *G06F 1/18*  (2006.01)
(52) U.S. Cl.
 CPC ...................................... *G06F 1/187* (2013.01)
 USPC ................. 361/679.37; 312/220; 296/216.03; 248/637
(58) Field of Classification Search
 CPC ........................................................ G06F 1/187
 USPC ............. 312/326, 223.2, 223.1, 223.3, 384.4, 312/265.5, 220, 222, 303, 323, 294; 361/679.37, 679.58, 679.02, 679.34, 361/679.57, 679.09, 679.41, 679.59, 679.6, 361/679.48, 679.33, 679.26, 679.3, 679.31, 361/679.4, 679.32; 345/175, 207, 92, 168, 345/265.6; 296/203.1, 216.02, 216.03; 248/423, 206.5, 637, 231.9, 918, 538, 248/520, 118, 188, 636
See application file for complete search history.

(56) References Cited

U.S. PATENT DOCUMENTS

| 2002/0089818 A1* | 7/2002 | Chen ............................. 361/683 |
| 2007/0210684 A1* | 9/2007 | Lin et al. .................... 312/223.2 |
| 2014/0001940 A1* | 1/2014 | Chang et al. .................. 312/326 |

* cited by examiner

*Primary Examiner* — Hung Duong
(74) *Attorney, Agent, or Firm* — Novak Druce Connolly Bove + Quigg LLP

(57) ABSTRACT

An enclosure includes a chassis and a bracket. The chassis comprises a rear panel with a latch hole. The bracket comprises a first sidewall. A resilient piece and a sustaining piece are located on the first sidewall. The resilient piece is elastically deformable as the bracket is rotated relative to the chassis, from a first position to a second position. When the bracket is in the first position, the resilient piece is engaged in the latch hole, and the sustaining piece is located between the first sidewall and the rear panel; when the bracket is in the second position, the resilient piece is disengaged from the latch hole, and the sustaining piece is engaged with the rear panel.

20 Claims, 5 Drawing Sheets

ELECTRONIC DEVICE ENCLOSURE WITH BRACKET FOR DATA STORAGE DEVICE

BACKGROUND

1. Technical Field

The present disclosure relates to enclosures, and particularly to an enclosure configured to mount a data storage device.

2. Description of Related Art

When a data storage device is mounted on a chassis of a server or a computer the data storage device can be received in a bracket. The bracket defines a plurality of securing holes. The chassis defines a plurality of threaded holes corresponding to the plurality of securing holes. Fixing members are inserted into the plurality of threaded holes and the plurality of securing holes, to secure the bracket to the chassis. The area around the chassis and around the data storage device is crowded with electronic components. The bracket has to be uninstalled before assembly or disassembly of other parts because the volume of the chassis is limited. However, assembly and disassembly of the bracket is very time-consuming and inconvenient.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
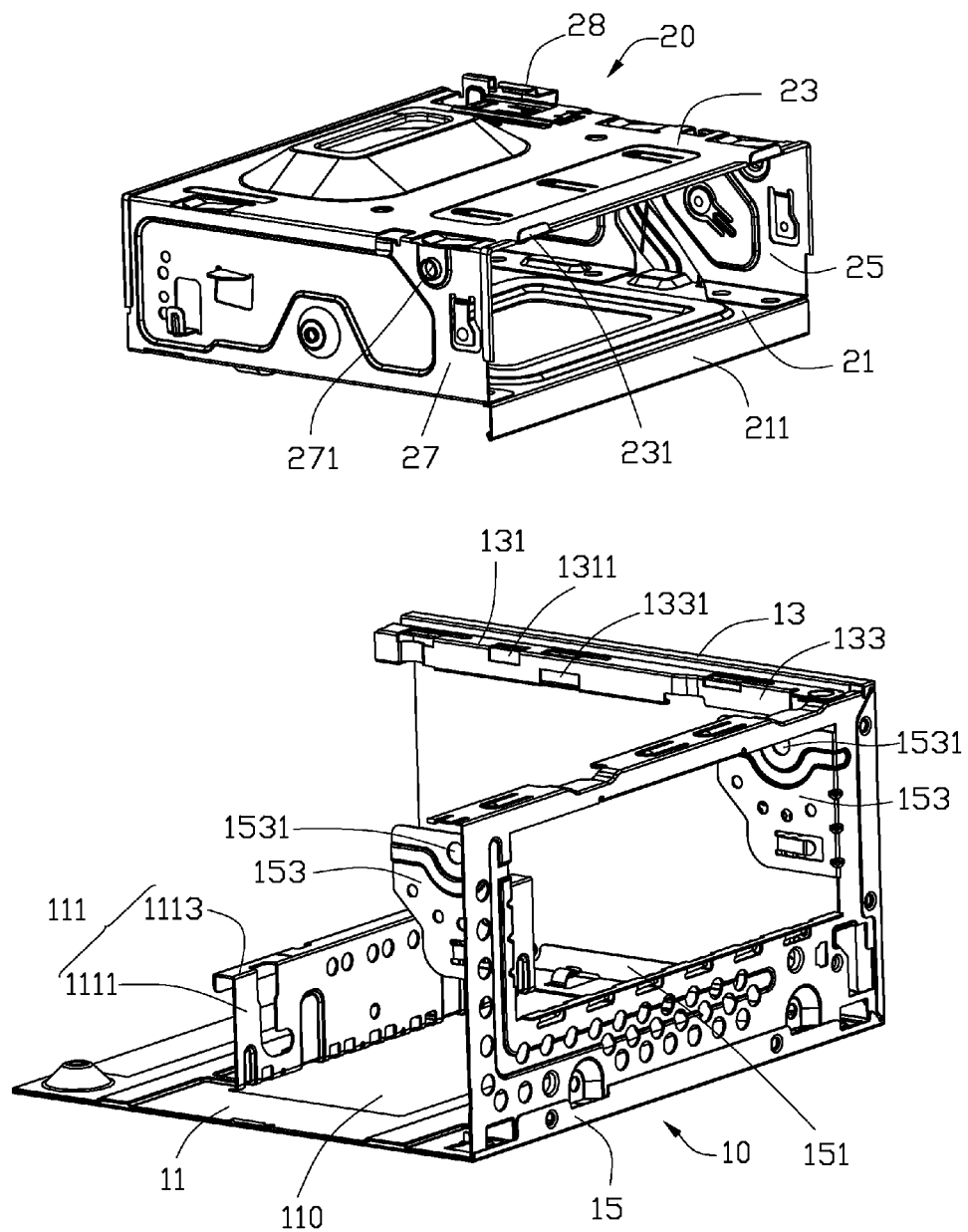
FIG. 1 is an exploded, isometric view of an embodiment of an enclosure, and the enclosure comprises a chassis and a bracket.

Referring to FIG. 1, an enclosure in accordance with an embodiment includes a chassis 10 and a bracket 20 secured to the chassis 10. The bracket 20 is configured to secure a data storage device (not shown), and the data storage device may be, for example, a hard disk drive, a floppy disk drive, and a CD-ROM drive.

The chassis 10 includes a bottom panel 11, and a rear panel 13 and a side panel 15 located on the bottom panel 11. In on embodiment, the rear panel 13 is perpendicularly connected to the side panel 15 and perpendicular to the bottom panel 11. The bottom panel 11 defines a ventilation hole 110. The supporting board 111 is located on the bottom panel 11. The supporting board 111 includes a positioning piece 1111 and a supporting piece 1113. The positioning piece 1111 extends inwards from an edge of the ventilation hole 110. In one embodiment, the positioning piece 1111 is substantially perpendicular to the bottom panel 11 and parallel to the side panel 15. A supporting piece 1113 extends outwards from a distal end of the positioning piece 1111. In one embodiment, the supporting piece 1113 is substantially perpendicular to the positioning piece 1111 and parallel to the bottom panel 11.

A first flange 131 extends inwards from a distal end of the rear panel 13. A second flange 133 extends downwards from a distal end of the first flange 131. A stopping hole 1311 is defined in the first flange 131 extending to the second flange 133. A latch hole 1331 is defined in the second flange 133.

The side panel 15 defines a rectangular opening 151. Two clamping pieces 153 extend inwards from the side panel 15 and are placed at two opposite edges of the opening 151. In one embodiment, the two clamping pieces 153 are parallel to each other and substantially perpendicular to the side panel 15. Each of the two clamping pieces 153 defines a pivot hole 1531.

Figure 2:
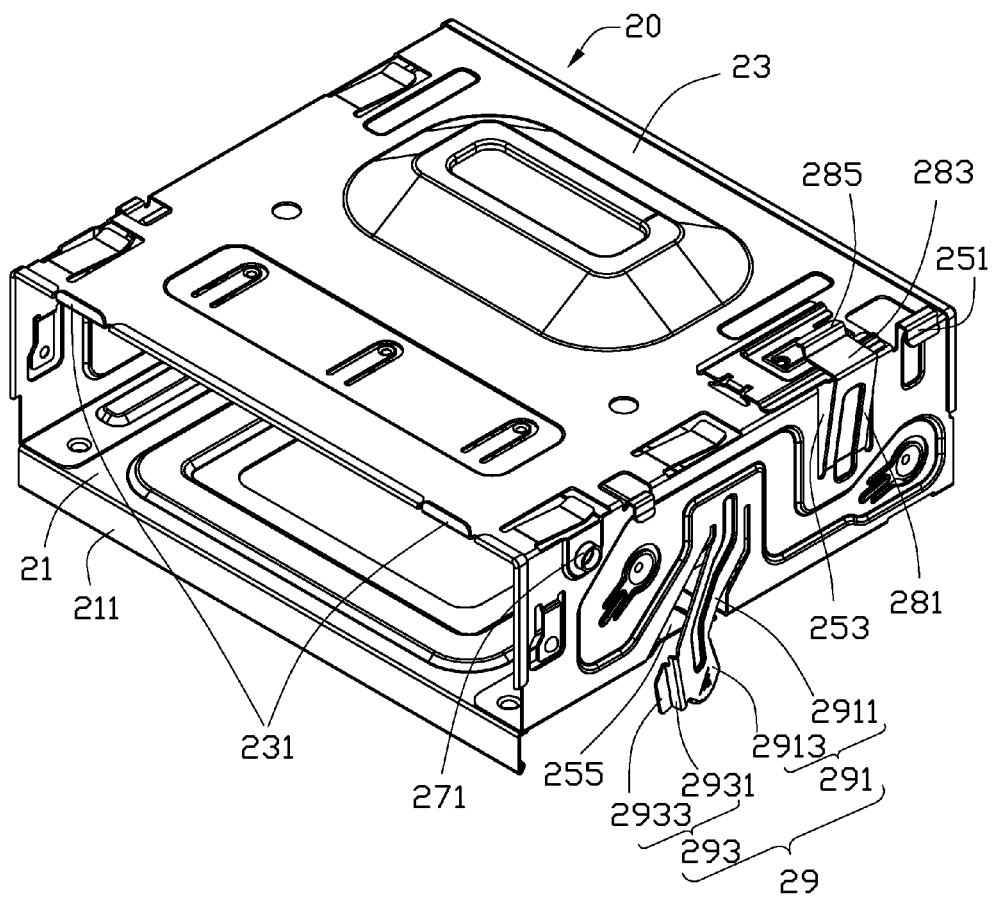
FIG. 2 is an exploded, isometric view of the bracket of FIG. 1.

Referring to FIGS. 1 and 2, the bracket 20 includes a bottom wall 21, a top wall 23, a first sidewall 25 and a second sidewall 27. In one embodiment, the second sidewall 27 is substantially parallel to the first sidewall 25 and perpendicularly connected to the bottom wall 21 and the top wall 23, and the bottom wall 21 is substantially parallel to the top wall 23. The bottom wall 21, the top wall 23, the first sidewall 25 and the second sidewall 27 cooperatively define a receiving space (not labeled) to receive the data storage device.

A resisting piece 211 extends downwards from a free edge of the bottom wall 21. Two rolling tabs 231 extend upwards from a free edge of the top wall 23. A pivot portion 271 extends from the first sidewall 25 and the second sidewall 27. In one embodiment, the pivot portion 251 is substantially a hollow column. A hook 251 is located on the first sidewall 25. The first sidewall 25 defines a receiving hole 253 extending to the top wall 23. A resilient piece 28 is obliquely located on the first sidewall 25 and placed at the bottom edge of the receiving hole 253. The first sidewall 25 defines a gap 255 extending to the bo.ttom wall 21. A sustaining piece 29 is located on the first sidewall 25 and placed at the top edge of the gap 255.

The resilient piece 28 includes a resilient portion 281, an engaging portion 283 and an operating portion 285. The resilient portion 281 is connected to the first sidewall 25. In one embodiment, a first acute angle is defined between the first sidewall 25 and the resilient portion 281. The engaging portion 283 extends inwards from a distal end of the resilient portion 281. In one embodiment, the engaging portion 283 is substantially perpendicular to the resilient portion 281. The operating portion 285 extends from a distal end of the engaging portion 283.

The sustaining piece 29 includes a resilient arm 291 and a sustaining portion 293. The resilient arm 291 includes a first portion 2911 and a second portion 2913. The first portion 2911 extends obliquely from the first sidewall 25. In one embodiment, a second acute angle is defined between the first portion 2911 and the first sidewall 25. The second portion 2913 extends downwards from a distal end of the first portion 2911. The sustaining portion 293 includes a latch tab 2931 and a blocking tab 2933. The latch tab 2931 extends inwards from the second portion 2913. In one embodiment, the latch tab 2931 is substantially perpendicular to the second portion 2913. The blocking tab 2933 extends obliquely from a distal end of the latch tab 2931. In one embodiment, the blocking tab 2933 is substantially perpendicular to the latch tab 2931 and parallel to the first sidewall 25.

Figure 3:
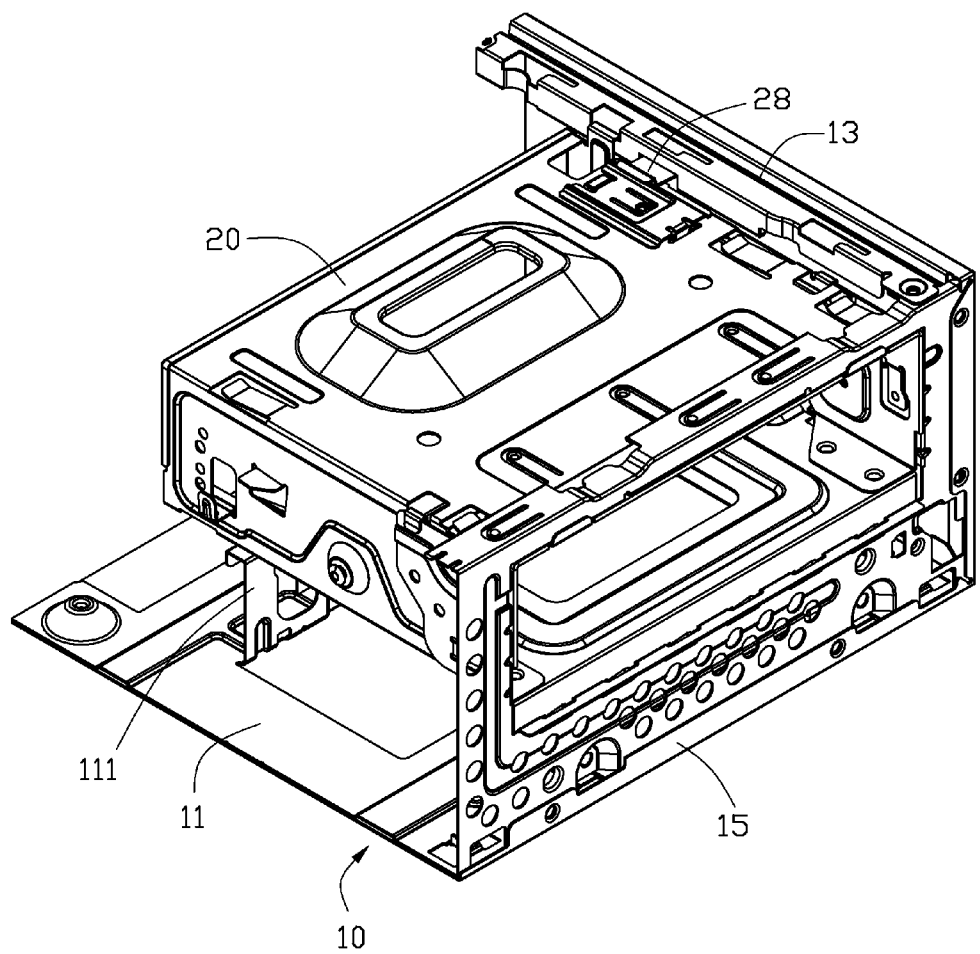
FIG. 3 is an assembled view of the enclosure of FIG. 1, and the bracket is in a first position.

Referring to FIG. 3, in assembly, one side of the bracket 20 is inserted slantwise into the chassis 10, until the two rolling tabs 231 rotatably engage with the side panel 15. The two clamping pieces 153 are splayed out, until the two pivot portions 251 are aligned with the pivot hole 1531. The two clamping pieces 153 return to rotatably engage in the pivot hole 1531. The other side of the bracket 20 is pressed into the chassis 10. The second flange 133 deforms the resilient portion 281 to be received in the receiving hole 253, until the engaging portion 283 is aligned with the latch hole 1331. The resilient portion 281 elastically returns the engaging portion 283 which engages into the latch hole 1331. The hook 251 is engaged in the stopping hole 1311. The resisting piece 211 abuts an inner side of the side panel 15. The bottom panel 11 abuts the supporting piece 1113. The bracket 20 is then in a first position, in which the sustaining piece 29 is located between the first sidewall 25 and the rear panel 13, and the resilient piece 28 is engaged in the latch hole 1331.

Figure 4:
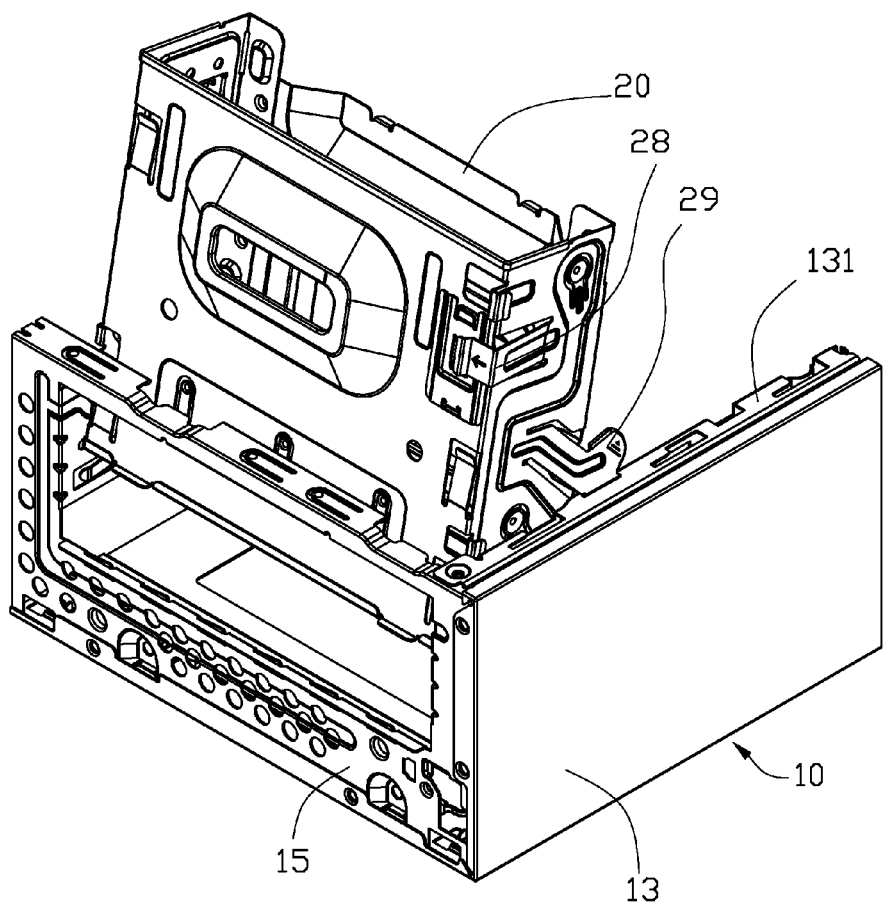
FIG. 4 is similar to FIG. 3, but showing the bracket in a second position.
Figure 5:
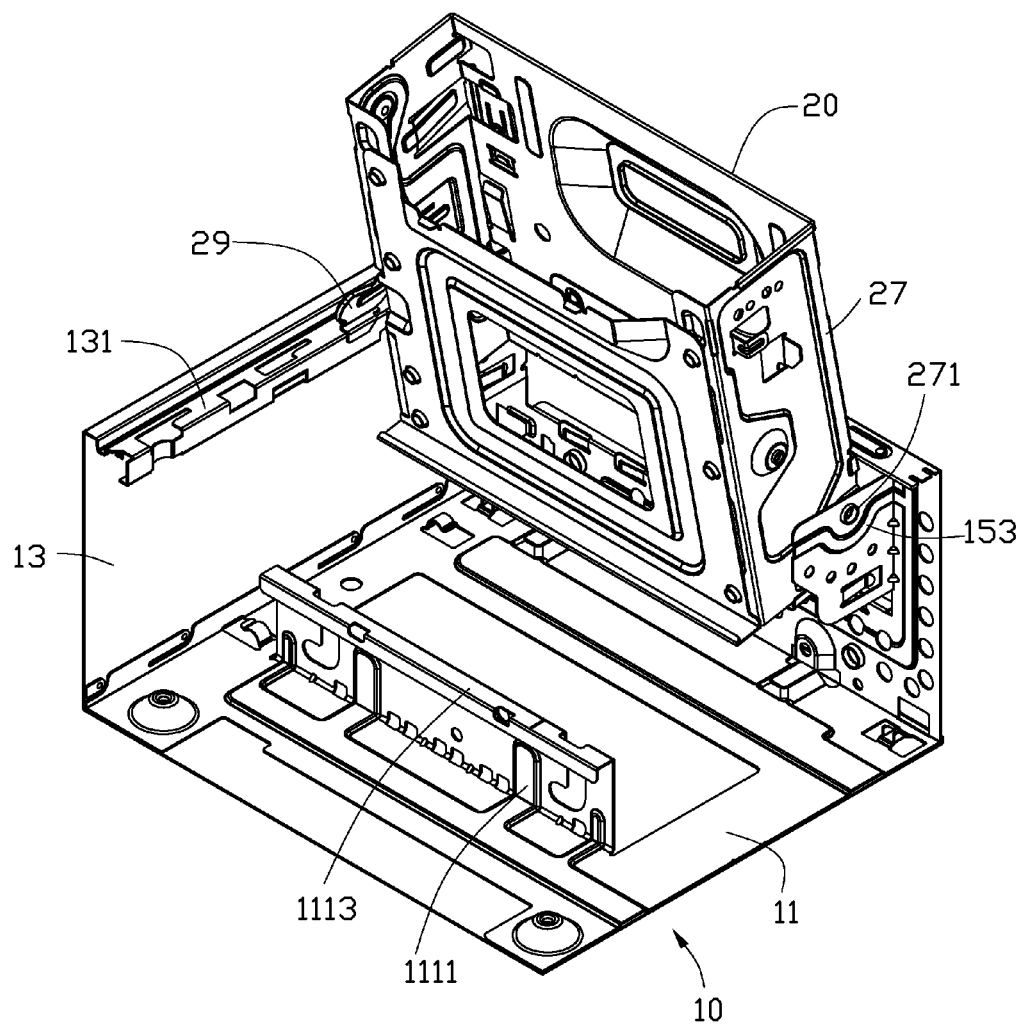
FIG. 5 is similar to FIG. 4, but the view is from a different aspect.

Referring to FIGS. 4-5, in the rotation of the bracket 20, the resilient portion 281 elastically deforms to disengage the engaging portion 283 from the latch hole 1331. The bracket 20 is rotated up around the pivot portion 251 to disengage the hook 251 from the stopping portion 1311. The second flange 133 presses against the resilient arm 291 of the sustaining piece 29 so it elastically deforms to be received in the gap 255, until the resilient arm 291 disengages from the chassis 10 and elastically returns. The bracket 20 is then in a second position, in which the resilient piece 28 is disengaged from the chassis 10 and the sustaining piece 29 is engaged with the first flange 131.

It is to be understood, however, that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. An enclosure comprising:
   a chassis, the chassis comprising a bottom panel, a rear panel and a side panel located on adjacent sides of the bottom panel, the rear panel defining a latch hole, two clamping pieces located on the side panel, each of the two clamping pieces defining a pivot hole;
   a bracket, the bracket comprising a first sidewall and a second first sidewall, a resilient piece and a sustaining piece on the first sidewall, a pivot portion on each of the first sidewall and the second sidewall; and
   wherein the pivot portion is pivotally engaged in the pivot hole, the resilient piece is elastically deformable to rotate the bracket relative to the chassis between a first position and a second position; when the bracket is in the first position, the resilient piece is engaged in the latch hole, the sustaining piece is located between the first sidewall and the rear panel; when the bracket is in the second position, the resilient piece is disengaged from the latch hole, and the sustaining piece is engaged with the rear panel.

2. The enclosure of claim 1, wherein the resilient piece comprises a resilient portion connected to the first sidewall, and a first acute angle is defined between the first sidewall and the resilient portion.

3. The enclosure of claim 2, wherein the resilient piece further comprises an engaging portion extending from the resilient portion, the engaging portion is engaged in the latch hole, the resilient portion is configure to be elastically deformed to disengage the resilient piece from the latch hole.

4. The enclosure of claim 3, wherein the engaging portion is substantially perpendicular to the resilient portion.

5. The enclosure of claim 2, wherein the first sidewall defines a receiving hole, and the resilient portion is elastically deformed to be received in the receiving hole.

6. The enclosure of claim 1, wherein the sustaining piece comprises a resilient arm, the first sidewall defines a gap, and the resilient arm is elastically deformable to be received in the gap.

7. The enclosure of claim 6, wherein the resilient arm comprises a first portion, and a second acute angle is defined between the first portion and the first sidewall.

8. The enclosure of claim 7, wherein the resilient arm further comprises a second portion extending from the first portion, and the second portion is substantially perpendicular to the first portion.

9. The enclosure of claim 8, wherein the sustaining piece further comprises a sustaining portion, and the sustaining portion is engaged with the rear panel when the bracket is in the second position.

10. The enclosure of claim 8, wherein the sustaining portion comprises a latch tab extending from the second portion, and the latch tab is substantially perpendicular to the second portion.

11. The enclosure of claim 10, wherein the sustaining portion further comprises a blocking tab extending from the latch tab, and the blocking tab is substantially perpendicular to the latch tab and parallel to the first sidewall.

12. An enclosure comprising:
    a chassis, the chassis comprising a rear panel, the rear panel defining a latch hole;
    a bracket, the bracket comprising a first sidewall, a resilient piece and a sustaining piece on the first sidewall; and
    wherein the resilient piece is elastically deformable to rotate the bracket relative to the chassis between a first position and a second position; when the bracket is in the first position, the resilient piece is engaged in the latch hole, the sustaining piece is located between the first sidewall and the rear panel; when the bracket is in the second position, the resilient piece is disengaged from the latch hole, and the sustaining piece is engaged with the rear panel.

13. The enclosure of claim 12, wherein the sustaining piece comprises a resilient arm, the first sidewall defines a gap, and the resilient arm is elastically deformable to be received in the gap.

14. The enclosure of claim 13, wherein the resilient arm comprises a first portion, and a second acute angle is defined between the first portion and the first sidewall.

15. The enclosure of claim 14, wherein the resilient arm further comprises a second portion extending from the first portion, and the second portion is substantially perpendicular to the first portion.

16. The enclosure of claim 15, wherein the sustaining piece further comprises a sustaining portion, and the sustaining portion is engaged with the rear panel when the bracket is in the second position.

17. The enclosure of claim 16, wherein the sustaining portion comprises a latch tab extending from the second portion, and the latch tab is substantially perpendicular to the second portion.

18. The enclosure of claim 17, wherein the sustaining portion further comprises a blocking tab extending from the latch tab, and the blocking tab is substantially perpendicular to the latch tab and parallel to the first sidewall.

19. The enclosure of claim 12, wherein the chassis further comprises a side panel, two clamping pieces extend from the side panel, and the two clamping pieces are parallel to each other.

20. The enclosure of claim 19, wherein the bracket further comprises a second sidewall opposite to the first sidewall, a pivot portion is located on each of the first sidewall and the second sidewall, each of the two clamping pieces defines a pivot hole, and the pivot portion is pivotally engaged in the pivot hole.

* * * * *